United States Patent Office 3,085,837
Patented Apr. 16, 1963

3,085,837
SLIDE BEARINGS
August Gunnar Ferdinand Wallgren, 33 Viktor
Rydbergsgatan, Gothenburg, Sweden
Filed Mar. 8, 1960, Ser. No. 13,646
Claims priority, application Sweden Mar. 9, 1959
4 Claims. (Cl. 308—121)

This invention relates to slide bearings.

More particularly this invention relates to slide or journal bearings of a type which may be used to advantage instead of a ball bearing, especially in such bearing cases when the ball bearing noise is a disturbing factor. There is a great demand for silent bearings, i.e. in the field of ventilation, in hot water pumps e.g. in dwelling houses, various kinds of assembly rooms and the like.

Still more particularly this invention relates to slide bearings comprising an inner and an outer annular member having mutually fitting sliding surfaces and casing members arranged on either side of said annular members, said casing members being connected with the outer annular member and extending radially inwards past the sliding surfaces. A slide bearing of this type may, with due observance of predeterminable conditions, have the same dimensions as a ball bearing and even be adapted to the standard specifications developed for ball bearings. However, the slide bearing causes particular difficulties by its demand for a liquid lubricant supply to the load transmitting surfaces, which are movable in relationship to one another. The surrounding bearing housing must always contain a quantity of oil and the difficulty is to bring about an efficient sealing against leakage between the shaft and the housing. A factor affecting leakage is the oil foam and the splashing formed at the rotation of the inner ring. Further it is an essential demand that the bearing is insensitive to entering impurities.

It is known in prior art to form the casing members above set forth in such a manner as to establish communication between the external oil bath in the bearing housing and the sliding surfaces and at the same time to be capable of efficiently preventing oil from forcing its way out. For this purpose a close meshed screen is used, which is carried by the casing members and through which the necessary communication through the casing member may take place.

It is one main object of the invention to provide an improved slide bearing of the type in consideration which in a more effective way than hitherto overcomes the difficulties set forth hereinbefore.

A further object of the invention is to provide a slide bearing of the type in consideration, the casing members of which may be manufactured considerably simpler and less bulky than in known constructions.

Figure 1:
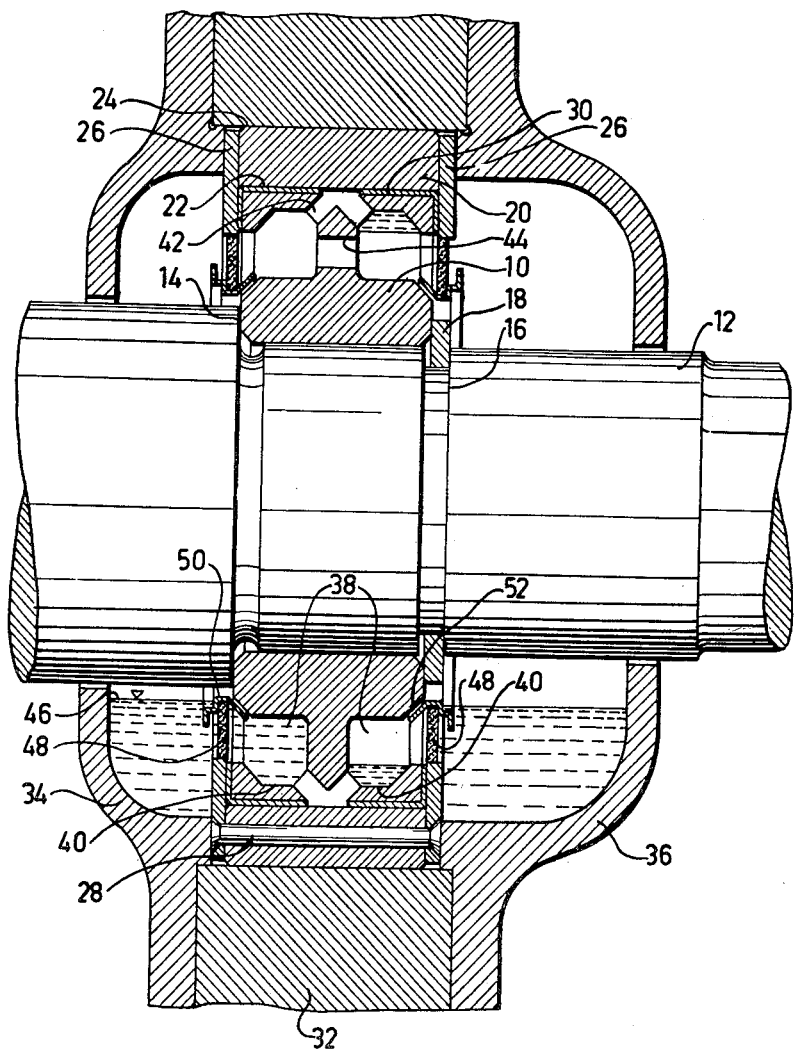
Figure 2:
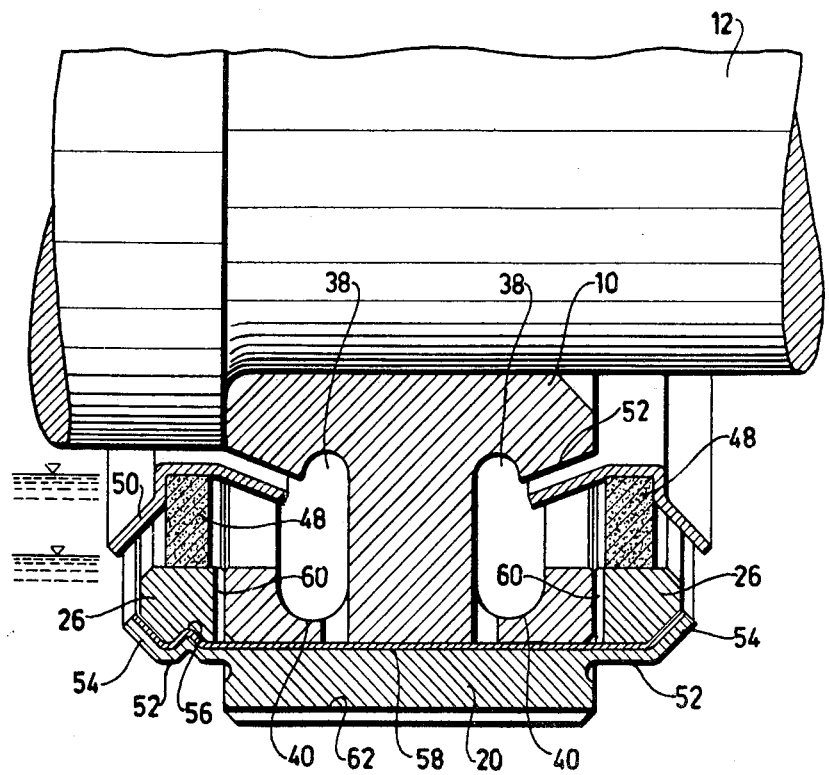

Further objects and advantages of the invention will become apparent from the following description, considered in connection with the accompanying drawings, which form part of this specification and of which:

FIG. 1 is in a section taken along the shaft an elevational view of a slide bearing constructed in accordance with the invention, and FIG. 2 is a similar view of a modified embodiment.

Referring to the drawings, reference numeral 10 denotes an inner bearing ring, in the embodiment shown assumed to be shrunk on a carried shaft 12 and guided axially between a shoulder 14 of the shaft and a snap ring 18 extending into a groove 16. It should be understood that the inner ring 10 may be joined with the shaft in any other way, such as by being mounted as a clamping sleeve. Mounted outside the inner ring is an outer ring 20, which has a cylindrical inner sliding surface 22 and also, in the embodiment illustrated in FIG. 1, an outer cylindrical bearing surface 24. But the latter may also be curved or provided with a central projecting support flange in a manner known per se. On either side of the rings 10 and 20, casing members are provided which form end walls for the unit, the radially outer portions of which walls in the embodiment shown in FIG. 1 consist of flat annular plates 26 secured to the outer ring by means of rivets 28, for example. The plates 26 extend slightly radially inwards over the inner ring 10, which is provided with liners 30 of an anti-friction metal, such as lead, bronze or white metal, against the plates as well as against the inner sliding surface 22 of the outer ring. Said parts of the bearing form a prefabricated unit which is capable of taking axial loads in both directions as well as radial loads, the plates 26 acting as axial thrust absorbing bearing members. The bearing unit is mounted with the outer ring 20 in a bearing housing 32 which may have covers 34, 36 on either side. The bearing unit has such a character that it completely conforms to the ball bearing specifications or only requires a small change of the surrounding covers 34, 36 in order to fit those dimensions of rolling contact bearings which have reference to the shaft 12 and the bearing housing 32.

The inner ring 10 has annular recesses 38 formed from both sides and constituting pockets 40 facing radially outwards. These pockets communicate with the radial sliding surfaces by obliquely drilled passages 42, e.g. at two diametrically opposed places. The chambers 38 communicate with one another through axial passages 44, which are spaced around the periphery in such a manner as in any position of the inner ring to ensure that at least one passage is submerged in the oil located in the lower portion of the bearing housing so that the oil here is capable of assuming the same level 46 on both sides of the bearing.

In accordance with the invention the radially inner portions of the end casing members are formed by annular discs or washers 48 fixed to and projecting radially inwardly from the inner peripheries of the plates 26. The washers or discs 48 are made of a porous material, preferably metallic, such as brass. They are preferably composed of a sintered (metal) powder whose particle size amounts to one or a few tenths of a millmetre. It is essential that the washers or discs are self-supporting by their material composition and dimensions, at the same time as they are pervious to the oil. The washers separate the outer oil bath from the interior of the bearing but permit at the same time a balancing of the oil level on both sides of the bearing. Simultaneously the voids passing through the washers 48 have such a fineness that they form a barrier separating such solid impurities entering the oil which have sizes adapted to cause damage to the sliding surfaces of bearing. If the thickness of the washer is one or a few millimetres, the individual voids will be bounded by a very large number of powder grains.

The discs or washers 48 may to advantage have such firmness as to serve as carriers of sealing elements 50 which form conical sealing gaps with an exceedingly small air gap at the radially inner portion of the inner ring 10. This gap will not be changed if the shaft with the bearing is displaced axially. These sealing gaps grow in diameter in a direction towards the chambers 38, for which reason oil leaking out through the gaps is thrown back to the chambers by centrifugal action while the minimized air gap prevents oil from creeping along the parts standing still. The sealing elements 50, which may be made of soft sheet plate, form a gutter as their diameter increases on both sides of the point of connection with the porous washers 48.

When the bearing is standing still the lower part of the chambers 38 is filled with oil as is indicated at the left part of the bearing in FIG. 1. When the shaft is rotated the oil adjusts itself annularly in the pockets 40 as indicated at the right part of the bearing. By the centrifugal force the oil is brought out through the passages 42 towards the sliding surfaces between the rings 10 and 20 and to the sliding surfaces between the ring 10 and the end walls 26 so as to ensure an adequate supply of lubricant for creating the load-carrying lubricant films. This oil supply is distributed around the periphery and will thus also find its way to those parts of the sliding surfaces which are above the oil level 46. The porous washers 48 permit oil to flow through them but will ensure simultaneously that the agitation caused by the rotating inner ring is not transmitted to the outer oil bath. Within the bearing oil foam is formed which cannot either be freely ejected from the interior of the bearing. Air penetrating into the oil will not impair the bearing strength of the bearing, as air bubbles are separated inwardly before the oil reaches the sliding surfaces. The sealing elements 50 form a sealing gap 52 against the inner ring 10 and also prevent oil pentrating the porous washers in the upper part of the bearing from flowing down onto the shaft wetting the same, which might cause a small leakage. This oil follows the gutters formed by the sealing members 50 and is brought therefore past the shaft directly down to the lower oil bath.

The embodiment according to FIG. 2 differs from the preceding one substantially by the fact that the stationary thrust loaded end walls 26 are made as rings having a smaller radius than the outer ring 20, whose outer portion therefore may be provided with an axial extension in accordance with the ball bearing specifications. The outer ring 20 is provided with sleeve-shaped extensions 52 which extend axially over the rings 26 and have the end portions 54 upset against the bevelled edges of said rings. Due to this folding over the bearing is capable of resisting high axial loads. The rings 26 are peripherally locked by the sleeve-shaped extensions 52 being pressed into cross grooves 56 in the ring at a few points, such as three.

The thrust loaded rings 26 are preferably made of bronze or similar material since the inner ring 10 in this embodiment has no liner of bearing metal. This feature is dependent on the fact that the outer ring 20 must be of soft steel in order for the edges 54 to be upset, for which reason the outer ring is internally coated with a layer 58 of bearing metal. The rings 26 may have a number of radial oil grooves 60, for instance three.

Instead of providing the inner ring 10 with axial bores, in the bearing shown in FIG. 2 communication is provided between the two outer sides of the bearing by means of grooves 62 provided in the outer periphery of the outer ring 20 and spaced around the periphery to the proper number. When the bearing sizes are small the recesses 38 in the inner ring 20 may be hard to machine, as the side openings in the inner ring get a very small height. Therefore the inner ring may be accurately moulded so that the side recesses obtain finished form, whereupon the ring is hardened and ground.

The sliding surface of the outer ring and the end walls 26, which surface coacts with the liner 30, may be hardened. In certain cases the porous or sintered washer 48 may form the complete end wall and thus extend over the outer ring 20. The flat sliding surface of the inner ring will then coact with the porous or sintered washer.

While several more or less specific embodiments of the invention have been shown and described, it is to be understood that this is for purpose of illustration only and that the invention is not to be limited thereby, but its scope is to be determined by the appended claims.

What I claim is:

1. A journal bearing structure comprising an inner bearing member having a radial journal bearing surface, an outer bearing member having a cooperating radial bearing surface, rotationally stationary housing means around said members providing a reservoir for fluid lubricant for the bearing, rotationally stationary casing members projecting radially inwardly from said housing means at the opposite sides of said outer bearing member to a diameter less than that of said bearing surfaces to divide said reservoir into different axially adjacent compartments comprising a central bearing compartment in which said bearing surfaces are located and two end reservoir compartments at the opposite sides thereof, the radially inner portions of said casing members consisting of porous material permitting relatively free and rapid passage of fluid lubricant therethrough from said end reservoir compartments to said bearing compartment while preventing agitation and aeration of the lubricant in the reservoir compartments due to the rotation of said inner bearing member.

2. A journal bearing unit for use in a bearing assembly providing a reservoir for liquid lubricant for the unit comprising an inner bearing member having a radial journal bearing surface, an outer bearing member having a cooperating radial bearing surface, casing members secured to said outer bearing member and extending radially inwardly at the opposite sides thereof to a diameter less than that of said radial bearing surfaces, said casing members comprising annular outer parts of non-porous material providing load carrying thrust bearing surfaces engaging the side walls of said inner bearing member to locate and retain the same axially with respect to said outer bearing member and radially inner parts consisting of self-sustaining porous material permitting relatively free and rapid passage of fluid lubricant from a reservoir located outside said unit to the bearing surfaces thereof.

3. A bearing unit as defined in claim 2, in which said inner parts are in the form of annular washers the axially inner faces of which are axially spaced from the sides of the inner bearing member whereby to be free from any thrust load imposed on the unit.

4. A bearing unit as defined in claim 2 in which the outer parts of said casing members are in the form of annular metal plates and in which the inner parts of said casing members are of metal sintered from powder having a particle size of the order of a few tenths of a millimeter to provide a highly porous structure.

References Cited in the file of this patent

UNITED STATES PATENTS

| | | |
|---|---|---|
| 1,810,296 | Sauer | June 16, 1931 |
| 2,209,103 | Palmgren | July 23, 1940 |
| 2,248,142 | Wallgren | July 8, 1941 |

FOREIGN PATENTS

| | | |
|---|---|---|
| 91,152 | Sweden | Dec. 28, 1957 |